United States Patent [19]

Akashi et al.

[11] 3,881,046

[45] Apr. 29, 1975

[54] MAGNETIC RECORDING MEDIUM

[75] Inventors: Goro Akashi; Masaaki Fujiyama; Yasuyuki Yama; Tokuaki Miyake, all of Odawara, Japan

[73] Assignee: Fuji Photo Film Co., Ltd., Kanagawa, Japan

[22] Filed: June 21, 1973

[21] Appl. No.: 372,369

Related U.S. Application Data

[63] Continuation-in-part of Ser. No. 186,786, Oct. 5, 1971, abandoned.

[30] Foreign Application Priority Data

Oct. 5, 1970 Japan ............................... 45-87411

[52] U.S. Cl. ................ 428/216; 117/217; 117/219; 117/239

[51] Int. Cl. ........................... B44d 1/18; H01f 1/00

[58] Field of Search ........... 117/215, 216, 217, 239, 117/240, 235, 219, 218

[56] References Cited

UNITED STATES PATENTS

| | | | |
|---|---|---|---|
| 2,677,728 | 5/1954 | Kolb et al. | 117/235 |
| 3,293,066 | 12/1966 | Haines | 117/240 |
| 3,297,418 | 1/1967 | Firestone et al. | 117/240 |
| 3,423,233 | 1/1969 | Akashi et al. | 117/235 |
| 3,442,699 | 5/1969 | Dalton | 117/219 |
| 3,617,378 | 11/1971 | Beck | 117/235 |

*Primary Examiner*—Cameron K. Weiffenbach
*Attorney, Agent, or Firm*—Sughrue, Rothwell, Mion, Zinn & Macpeak

[57] ABSTRACT

A magnetic recording medium for use in recording short-wavelength which is excellent in easiness of marking by a black or dark color marking material, in easiness and validity of discrimination of the mark, and in antistatic effect can be prepared by providing a magnetizable layer on one side of a non-magnetizable plastic film and providing a layer having a surface electric resistance of below $1 \times 10^9$ ohm on the opposite side and further, a white or light color layer thereon.

12 Claims, No Drawings

MAGNETIC RECORDING MEDIUM

CROSS-REFERENCE TO RELATED APPLICATION

This application is a Continuation-In-Part application of our earlier co-pending application, Ser. No. 186,786, now abandoned, filed on Oct. 5, 1971, and claims priority from Oct. 5, 1970, based on Japanese patent application Ser. No. 87411/70.

BACKGROUND OF THE INVENTION

1. Field of the Invention

The present invention relates to a magnetic recording medium for use as a video tape, audio tape, memory tape, magnetic recording card, etc. Heretofore, a magnetic recording medium basically comprises a magnetizable layer provided on one side of a support. When the adherence of the magnetizable layer to the support is poor, the layer has been provided on an undercoated support; and also, when the magnetic recording layer comprises multiple, laminated layers, a layer having dispersed therein a powdered material having a gliding property, such as graphite, tungsten sulfide, or molybdenum sulfide, etc., has been provided on the back side of the support opposite the side provided with the magnetizable layer for improving the sliding property of the magnetic recording medium. Further, an electrically conductive layer having dispersed therein a fine powder of an electrically conductive substance such as carbon black, graphite, etc. has been provided on the back side for making the magnetic recording medium antistatic.

Heretofore, a transparent plastic film has been used as the support of magnetic recording media, however, the back surface of such media has turned the color of the magnetizable layer (dark brown) through the support and the back surface of the magnetic recording media provided with a gliding layer, electrically conductive layer, etc. has turned black.

On the other hand, a magnetic recording medium, after recording, had to be discriminated by a marking on the medium or its packaging container (case, reel, or outer packaging box) because the recording on the magnetic recording medium is not visible.

Various colored tapes have been connected for discrimination of recording; however, in case of putting numerous and various recordings in the same magnetic recording medium, it is rather convenient to make it possible to directly put a marking on the magnetic recording medium and this is preferable from the point of view that the same number of markings as that of the recordings can be produced.

When considering the fact that a black or dark color system of material, as in a pencil or ink, is generally used and the fact that a black writing on a white background is more easily discriminative than a white writing on black background, the back surface of the magnetic recording medium must necessarily be white for making it possible to use numerous marking materials. For this purpose, it is considered that a layer having dispersed therein a white or light color pigment is provided on the back surface of the support of the magnetic recording medium. However, such constitution of a magnetic recording medium has such a defect as being high in electric charge. Because the electrification of a magnetic recording medium tends to cause an electrostatic adsorption of dust thereon, the result is a situation extremely unfavorable for recording onto the magnetic recording medium and regeneration thereof.

2. Description of the Prior Art

U.S. Pat. No. 3,293,066 discloses an electroconductive backing layer. However, this reference is defective from the standpoint that even if a white paper as described in U.S. Pat. No. 2,258,106 is provided on the electroconductive backing layer as taught by U.S. Pat. No. 3,293,066, the resulting assembly cannot be used for recording and reproducing video signals because the paper or varnish is coated on the surface of the magnetic recording layer and the surface properties of the paper are insufficient to provide a satisfactory S/N ratio upon video recording.

In addition, with respect to the combination of the carbon black and silica to the extent of at least 18% by volume as taught by U.S. Pat. No. 3,293,066, the resulting layer will naturally turn black and no markable layer is observed.

U.S. Pat. No. 2,258,106 discloses a card-shaped magnetic recording sheet, which cannot be applied to short-wavelength recording, such as video recording because (1) the paper or varnish is coated on the surface of a magnetic recording layer and therefore, recordation or reproducing of video signals to the extent of 2 to 4 microns is impossible; (2) the surface properties of the paper or the like is insufficient to provide a satisfactory S/N ratio upon video recording; and (3) when a white colored layer, as in the present invention is replaced by paper, it is impossible to form a paper layer having a thickness as thin as 1–3 microns. As such, the total thickness of the magnetic recording medium is so large that it cannot be practically employed.

SUMMARY OF THE INVENTION

An object of the present invention is to provide a magnetic recording medium for use in recording short-wavelength which is excellent in easiness of marking by a black or dark color marking material, in easiness and validity of discrimination of the mark, and in antistatic effect.

According to the present invention, a magnetic recording medium for use in recording short-wavelength is provided comprising a magnetizable layer on one side of a support, made of a plastic film, and, on the opposite side thereof, a layer having a surface electric resistance of below $1 \times 10^9$ ohm and a white or light color layer thereon.

DESCRIPTION OF THE PREFERRED EMBODIMENTS

The support of the magnetic recording medium in the present invention is selected from various plastic films. To be specific, the plastic film support can be a material such as polyethylene terephthalate, polyvinyl chloride resin, cellulose acetate, cellulose nitrate, polystyrene cellulose ether, polyamide resin, polycarbonate resin, etc. which may be film-like or sheet-like. The thickness is not specifically limited.

However, in the present time when a large amount of recording is required for a small area of recording, the magnetic recording medium is preferably thin although it may be card-like or tape-like, and the appropriate thickness is within the range of 4 to 150 $\mu$. In case of being thinner in thickness, it is poor in strength as a support and it is difficult to be handled. Of course, such problems are different in degree according to the form of the magnetic recording medium.

Many magnetizable layers provided on such a support have hitherto been known, and may be divided broadly into two classes, that is, one being a type of film comprising a fine powder of a ferromagnetic body dispersed in a binder and another being a type of ferromagnetic film formed by electric plating, or non-electric plating or evaporating. Both types have hitherto been publicly known, and many techniques have been known on the form, preparation process, etc., which may be suitably utilized.

The electrically conductive layer and white layer, the most characteristic feature in the present invention, will be explained as follows:

Substantially, the electrically conductive layer has a surface electric resistance of below $1 \times 10_9$ ohm; however, to be more specific, this layer is one prepared by dispersing a powder of an electrically conductive material such as carbon black, graphite, copper, aluminum, silver, etc. in a solution of a binder, applying the resulting dispersion onto a surface of a support and drying it. The applying may be carried out at the same time as, before, or after the coating of the magnetizable layer. If necessary, it may be applied after providing an undercoating layer on a surface of the support. The thickness of the electrically conductive layer is adjusted so that the surface electric resistance is below $1 \times 10^9$ ohm, although the surface electric resistance is rather affected by the composition of the layer; that is, the distribution state and content of the electrically conductive substance in the electrically conductive layer. The ratio of electrically conductive powder to binder is 10:1 – 1:2 by weight and the thickness of the electrically conductive layer may be within the range of 0.3 to 5 $\mu$, when such a content ratio is employed. The powder employed in the electrically conductive layer may have a size of preferably about 0.01 – 10 $\mu$.

The binder which is used in the electrically conductive layer is quite the same as that used for forming a magnetizable layer, and, to be specific, includes vinylchloride-vinyl acetate copolymers, silicon resins, polyamide resins, phenol resins, butadiene-acrylonitrile copolymers, nitrocellulose, polyurethane resins, epoxy resins, melamine resins, vinylidene chloride-acrylonitrile copolymers, polyacrylic acid resins, methacrylic acid resins, etc. These components of the binder may be used alone or in combination.

In order to form an electrically conductive layer, such binder is dissolved in a solvent such as a single or combined solvent system of, for example, methyl ethyl ketone, ethyl acetate, tetrachloroethane, acetone, benzene, toluene, to make a solution and the above-described electrically conductive powder substance is then mixed into the solution to obtain a coating liquid. The concentration, mixing ratio, etc. of liquid aare decided so that the liquid can be easily coated, a uniform film can be formed and the electric conductive layer formed is below $1 \times 10^9$ ohm in surface electric resistance. The coating liquid so prepared may be coated onto a support by a conventional coating technique.

On the other hand, the white layer is a layer having dispersed therein a white or light color pigment powder in a binder and is provided on the above-mentioned electric conductive layer.

This coating may be carried out at the time of forming the electrically conductive layer (by a type of multiple layer coating) or after forming the layer. The white or light color pigment may include a white pigment, such as lead white, zinc white, lithopone, titanium white, etc., another type of white pigment such as barite powder, precipitated barium sulfate, limestone powder, precipitated calcium carbonate, chalk, aluminum hydroxide, talc powder, kaoline, etc. and a yellow pigment such as lead yellow, zinc yellow, cadmium yellow, etc.

Thus, from the object of the present invention, the color phase of the pigment is preferably white although a light color phase may be similarly used since it also can be discriminated from the black of the mark. The binder in which these white pigments are dispersed is the same as that used in the above electrically conductive layer. Both binders may be the same or different in composition, but are sometimes limited in a point of adhesiveness of both layers. The particle size of the white pigment is not particularly limited although it is preferably within the range of 0.005 – 20 $\mu$ when the content ratio of pigment to binder is 10:1 to 1:2 by weight, the desired white layer is obtained. However, the limitation of range varies depending upon the kinds of pigments and the particle size thereof and is not critical. And also, the thickness of the white layer is satisfactory if it is such a degree that the mark by a black marking material can be discriminated and is preferably as thin as possible. The preferred thickness range is 0.5 – 5 $\mu$ and largely varies depending upon the kinds of pigment, the particle size and the percentage of pigment incorporated into the binder.

The magnetic recording medium of the present invention has many advantages, among which is the fact that there is scarcely an electrostatical adherence of dust and therefore there is no drop-out at the time of magnetic recording or regeneration since the medium is very little in electrification, and further, the recording content can be discriminated since the back surface can be marked by a black or dark color marking agent.

The present invention will be illustrated in detail with the following comparative example and working examples of the present invention:

COMPARATIVE EXAMPLE 1

100 parts of $TiO_2$ of about 0.2 $\mu$ in average particle size, 100 parts of thermoplastic polyurethane resin and an appropriate amount of methyl ethyl ketone solvent were milled and dispersed in a ball mill for about 60 hours and coated, in such a manner that the drying thickness was 2 $\mu$, onto the back surface of a coated material (obtained by coating a needle ferromagnetic $\gamma$-$Fe_2O_3$ of $0.6 \times 0.1 \times 0.1$ $\mu$ in average particle size on one side of a polyethylene terephthalate film of 25 $\mu$ in thickness together with a binder solution substantially comprising a vinyl chloride-vinyl acetate copolymer and drying) and dried to obtain a white layer coated thereon.

The coated material thus prepared was calendered in the same manner as in the conventional manufacturing of video tape and thereafter cut to a tape of one-half inch in width to obtain a video tape.

The surface electric resistance of white layer of this video tape was above $10^{10}$ ohm. After investigating drop-out, it was found that this video tape was increased in drop-out with an increase of frequency of use in comparison with the magnetic recording medium of the present invention.

EXAMPLE 1

100 parts of an amorphous polyester resin, having a softening point of about 65°C., 120 parts of electrically conductive carbon black of 27 mμ in average particle size and 450 parts of tetrachloroethane were dispersed in a ball mill for about 48 hours and thereafter coated, in a dry thickness of 2 μ, as the first layer on one side of magnetic tape (obtained by coating needle magnetic particles of 0.6 × 0.1 × 0.1 μ in particle size together with a binder substantially comprising a vinylchloride-vinyl acetate copolymer on the other side of a polyethylene terephthalate film of 25 μ in thickness) and, after drying, a white layer substantially comprising $TiO_2$ of about 20 mμ in average particle size was coated in a dry thickness of 1.5 μ as the second layer on the surface thereof and dried.

The white layer was prepared by dispersing 100 parts of the $TiO_2$, 100 parts of a thermoplastic polyurethane resin and an appropriate amount of methyl ethyl ketone solvent in a ball mill for about 60 hours.

After calendering in the same manner as in the conventional manufacturing process of video tape, the coated material was cut to a tape of one-half inch in width. This tape was set in a helical type of VTR (NV-1050 type) for one-half inch width and the discrimination of a mark was judged for detecting a position in quick feeding and quick winding back.

At this time, a different color stripe of about 2 cm in width was recorded by using a darmatograph (trademark) manufactured by Mitsubishi Pencil Co. since the back surface of the tape was white.

As a result, no discrimination error was recognized when the test was repeated 10 times.

In contrast, one-half inch video tapes manufactured by 3M-Scotch 351 and Scotch 388 (the back surface not being coated with a black backing layer) and Scotch 400 (a black layer being provided as a backing layer) — were tested with respect to their mark discrimination in the same condition, and the discrimination was almost impossible and was possible with a probability of 20 to 40% only under good illumination. Further, the surface electric resistance of the tape as above produced was $3.5 \times 10^4$ ohm only with the first layer, therefore, this tape was excellent in antistatic effect and was below 10V in electrification voltage even during quick feeding.

EXAMPLE 2

In manufacturing a video tape using a polyethylene terephthalate film of 25 μ in thickness, the magnetizable layer and the first layer on the back surface were prepared in the same manner as in Example 1, and further a mixture of 100 parts of $TiO_2$, 100 parts of synthetic rubber (chlorosulfonated polyethylene), methyl ethyl ketone solvent and a slight amount of dye were dispersed in a ball mill for about 60 hours, and, thereafter, was coated in a dry thickness of 1.5 μ and dried.

After calendering in the same manner as in the conventional manufacturing process of video tape, the coated material was cut to a tape of 2 inches in width. In this Example, the following three kinds of tape were obtained.

| No. | Color | Dye | Probability of discrimination A | B |
|---|---|---|---|---|
| 1 | light green | Oil Green BG | 20/20 | 20/20 |
| 2 | light red | Oil Red RR | 20/20 | 20/20 |
| 3 | light blue | Oil Blue IIN | 10/20 | 20/20 |

As a result of repeating the discrimination test of marks for detecting a position in the same condition as in Example 1, this tape could be almost completely discriminated. At this time, for the purpose of improving the experimental accuracy, the test was conducted by two persons, A and B, and one discrimination error on light blue was experienced by A, however, this is considered to influence the general situation.

Further, the electrification voltage of the tape during quick feeding was measured and was below 10V, and was thus excellent in antistatic effect.

EXAMPLE 3

In case of manufacturing the tape of the present invention in the same condition as in Example 1, five kinds of tape were obtained by varying the weight ratio of carbon black to binder in the first layer as follows:

| No. | Amount of carbon black | Amount of binder | Electrification voltage | Electric resistance |
|---|---|---|---|---|
| 1 | 50 | 100 | 100 – 300 V | $8.7 \times 10^{13}$ |
| 2 | 70 | 100 | 50 – 100 V | $6.2 \times 10^{10}$ |
| 3 | 100 | 100 | 0 – 20 V | $9 \times 10^{8}$ |
| 4 | 120 | 100 | <10 V | $3.5 \times 10^{4}$ |
| 5 | 150 | 100 | <10 V | $7 \times 10^{3}$ |

The result of measuring the electrification voltage and surface electric resistance of the first layer during quick feeding by using this tape were as in the above table and adherence of dust and discharging noise by electrification were recognized only in Nos. 1 and 2 but none was recognized in the samples of below about $1 \times 10^9$ ohm.

Therefore, the surface electric resistance of the first layer is considered to be desirably below $10^9$ ohm.

EXAMPLE 4

As a result of carrying out the discrimination test of marks for detecting a position substituting graphite of 0.5 μ in particle size for carbon black in the first layer and using ZnO of 2 μ in average particle size as a white pigment in the second layer in the same condition as in Example 1, almost the same good discrimination as in the above-mentioned Example was possible.

As described above, the magnetic recording medium of the present invention provides a magnetizable layer on one side of a plastic base and a two-component laminated back layer, the first layer thereof being below $10^9$ ohm in surface electric resistance and the second layer being a white or light color layer; and the present invention is characterized in that, in using this magnetic tape, detection of position and appropriate recording of information are possible by a commercially available black ink or similar ink and discrimination is accurate as well as defects such as discharge noise generated by electrification of the tape and drop-out by dust adhered thereto, etc. can be avoided.

Further, a tape excellent in article value can be obtained by light coloring the second layer.

Further, the present inventors confirmed that the instant magnetic tape is practically and very easily used by printing time-marks and lengthmarks on the surface of the second layer.

For the purpose of recording short-wavelength signals (e.g., video signals), which is the main thrust which the present invention is directed, the combination of the two layers described in accordance with the present invention is extremely effective as can be shown in the Table set out below:

TABLE

| | Short wavelength signal (e.g., video signal) | Long wavelength signal (e.g., audio signal) |
|---|---|---|
| Relative velocity of head & tape | 11 m/sec – 38 m/sec | 19 cm/sec |
| Recorded frequency | 3 – 10 MHz | 200 Hz – 10 KHz |
| Recorded wavelength | 1.5 – 12 μ | 19 – 950 μ |
| Gap Loss | more than −9 dB | −1 – −6 dB |

As can be seen in the Table, recited above, video signals and audio signals are quite divergent from each other in the relative velocity of head and tape, recorded frequency and the like.

Consequently, where recorded wavelength is short, as would be the case with a video signal, the magnetic recording medium is liable to be influenced by the unevenness of the surface thereof. As an example, where the surface has the unevenness of 2 μ, there is caused a reduction of greater than 9 dB in output in the case of a video tape, while there is produced, a 1–6 dB reduction in output in the case of an audio signal. This reduction in output can be expressed as $54.6\ d/\tau$ (dB) wherein $d$ represents the unevenness of the tape surface and $\tau$ represents the recorded wavelength.

Although the present invention has been adequately described in the foregoing specification and Examples included therein, it is readily apparent that various changes and modifications can be made thereto, without departing from the spirit and scope thereof.

What is claimed is:

1. A magnetic recording medium for use in recording short-wavelength comprising a non-magnetizable plastic film support having a magnetizable layer on one side thereof and, on the other side thereof, a first layer having a surface electric resistance of below $1 \times 10^9$ ohm and a second layer comprising a pigment that can be easily marked by a marking material and provides easy visual discrimination of a mark produced thereon by said marking material.

2. The magnetic recording medium of claim 1, wherein said second layer comprising a pigment can be easily marked by a black marking material and provides easy visual discrimination of a mark produced thereon by a black marking material.

3. The magnetic recording medium of claim 1, wherein said first layer comprises an electrically conductive substance dispersed in a binder.

4. The magnetic recording medium of claim 3, wherein said electrically conductive substance comprises carbon black, graphite, copper, aluminum or silver.

5. The magnetic recording medium of claim 1, wherein said second layer comprises yellow pigment dispersed in a binder.

6. The magnetic recording medium of claim 5, wherein said colored pigment is lead yellow, zinc yellow, or cadmium yellow.

7. The magnetic recording medium of claim 1, wherein said second layer comprises a white pigment dispersed in a binder.

8. The magnetic recording medium of claim 7, wherein said pigment is white lead, zinc white, lithopone, titanium white, barite, barium sulfate, limestone, calcium carbonate, chalk, aluminum hydroxide, talc, or kaolin.

9. A magnetic recording medium for use in recording short-wavelength consisting essentially of a non-magnetizable plastic film support having a magnetizable layer on one side thereof, and on the other side thereof, a first layer having a surface electric resistance of below $1 \times 10^9$ ohm and a second layer coated onto said first layer consisting essentially of a pigment dispersed in a binder, said second layer can be easily marked by a marking material and provides easy visual discrimination of a mark produced thereon by said marking material, said magnetizable layer having a thickness of from 4 to 150 μ and said first layer consisting essentially of a powder of an electrically conductive material dispersed in a binder.

10. The magnetic recording medium of claim 10, wherein said powder of said electrically conductive material has a particle size of from 0.01 to 10 μ, wherein said first layer has a thickness of from 0.3 to 5 μ and wherein the weight ratio of said electrically conductive powder to said binder is from 10:1 to 1:2, wherein said pigment has a particle size of from 0.005 to 20 μ, wherein the thickness of said second layer varies from 0.5 to 5 μ and wherein the weight ratio of said pigment to said binder in said second layer varies from 10:1 to 1:2.

11. The magnetic recording medium of claim 11, wherein said magnetizable layer comprises a fine powder of a ferromagnetic material dispersed in said binder.

12. The magnetic recording medium of claim 11, wherein said magnetizable layer comprises a plated ferromagnetic film.

* * * * *